United States Patent
Chan et al.

(10) Patent No.: US 6,870,807 B1
(45) Date of Patent: Mar. 22, 2005

(54) METHOD AND APPARATUS FOR SUPPRESSING MUSIC ON HOLD

(75) Inventors: Norman C. Chan, Louisville, CO (US); Rickie E. Meis, Arvada, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/570,824

(22) Filed: May 15, 2000

(51) Int. Cl.[7] .................... H04J 3/00; H04M 9/08
(52) U.S. Cl. ............... 370/201; 370/260; 370/271; 379/406.01
(58) Field of Search ............... 370/201, 260, 370/263, 268, 269, 271, 286, 289, 290, 352, 259; 379/3, 88.01, 406.01, 406.04, 406.08, 202.01, 120

(56) References Cited

U.S. PATENT DOCUMENTS

| | | | |
|---|---|---|---|
| 5,206,903 A | 4/1993 | Kohler et al. | 379/309 |
| 5,243,659 A * | 9/1993 | Stafford et al. | 381/86 |
| 5,548,638 A | 8/1996 | Yamaguchi et al. | 379/202 |
| 5,701,340 A | 12/1997 | Zwick | 379/204 |
| 5,724,416 A * | 3/1998 | Foladare et al. | 379/202.01 |
| 5,825,858 A * | 10/1998 | Shaffer et al. | 379/120 |
| 5,828,747 A | 10/1998 | Fisher et al. | 379/309 |
| 5,848,163 A * | 12/1998 | Gopalakrishnan et al. | 381/56 |
| 5,905,793 A | 5/1999 | Flockhart et al. | 379/266 |
| 5,982,873 A | 11/1999 | Flockhart et al. | 379/266 |
| 6,088,441 A | 7/2000 | Flockhart et al. | 379/265 |
| H1881 H * | 10/2000 | Davis et al. | 370/458 |
| 6,141,341 A * | 10/2000 | Jones et al. | 370/352 |
| 6,163,607 A | 12/2000 | Bogart et al. | 379/266 |
| 6,173,053 B1 | 1/2001 | Bogart et al. | 379/266 |
| 6,192,122 B1 | 2/2001 | Flockhart et al. | 379/266 |
| 6,349,136 B1 * | 2/2002 | Light et al. | 379/202.01 |
| 6,535,600 B1 | 3/2003 | Fisher et al. | 379/265.12 |
| 6,556,670 B1 * | 4/2003 | Horn | 379/202.01 |

* cited by examiner

Primary Examiner—Chi Pham
Assistant Examiner—Anh-Vu Ly
(74) Attorney, Agent, or Firm—Sheridan Ross P.C.

(57) ABSTRACT

The subject invention is directed to a method and system for removing music or other unwanted noise from a conference call particularly when the music or other unwanted noise is not directly under the control of the telecommunication equipment the user is attached to and using. The method and system detects the unwanted sound, deactivates the sound source or disconnects from the line carrying the sound, monitors the disconnected line for voice energy, and reconnects the line when voice energy is detected. This capability provides the telecommunications equipment user with control over unwanted music sources being provided by equipment located either in the private or public networks.

27 Claims, 3 Drawing Sheets

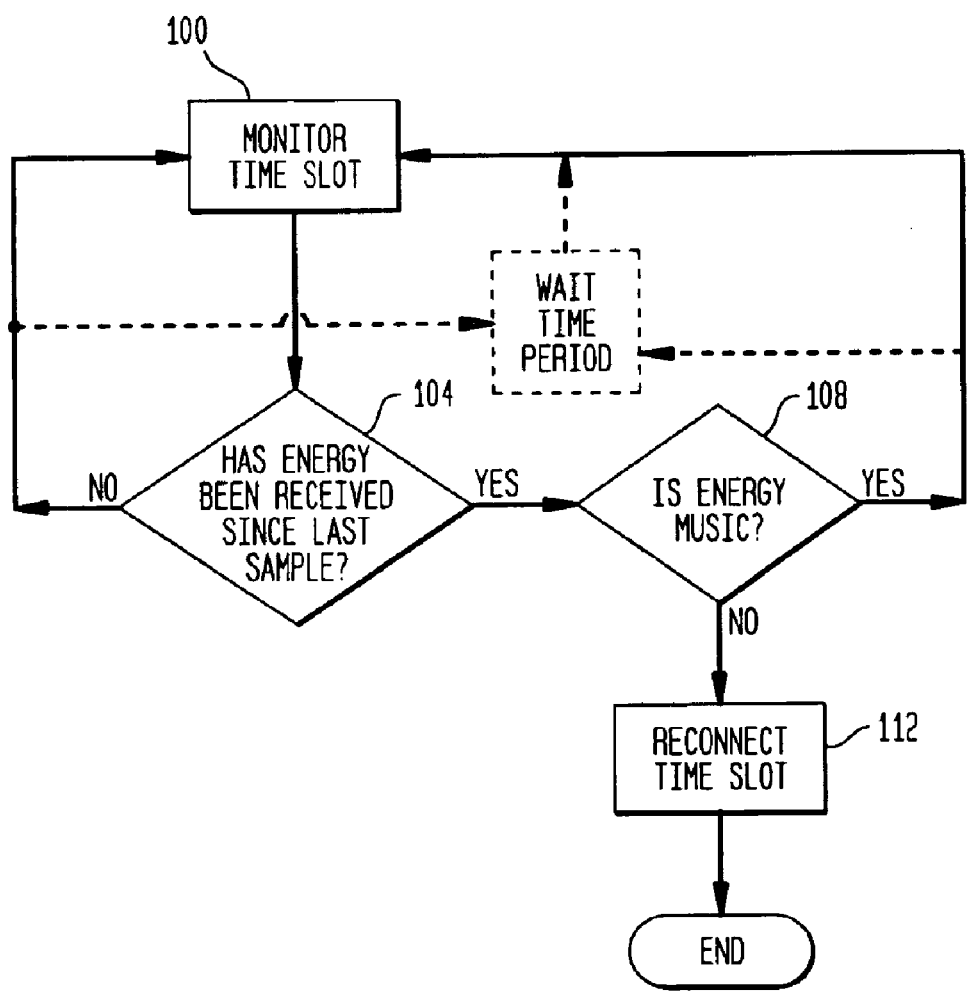

METHOD AND APPARATUS FOR SUPPRESSING MUSIC ON HOLD

FIELD OF THE INVENTION

The method and apparatus of the present invention is directed generally to suppressing unwanted sound during a telephone conversation and specifically to suppressing unwanted music during a telephone conversation.

BACKGROUND OF THE INVENTION

It is a common occurrence in telephone conversations for one party to place another party on hold while the former party performs tasks, such as referencing records, answering another telephone call and the like. Many telecommunication systems play music during the duration of the holding period to provide a pleasurable distraction for the holding party.

Although many parties prefer to listen to music during the holding period, some parties would prefer to suppress or deactivate the music, particularly where three or more parties are engaged in a conference call. In conference calls involving three or more parties, the music can impede the holding parties' ability to engage in a conversation during the holding period.

Existing telecommunication infrastructures do not have the capability of suppressing or deactivating the music, unless the source of the music is local to the telecommunication equipment serving the holding party. It is often not possible for the remote telecommunication equipment to process deactivation commands from the local switch.

SUMMARY OF THE INVENTION

The method and architecture of the present invention solves these and other problems and represents a significant advancement over the art. Generally, the present invention is directed to methods and architectures for suppressing entirely or partially (i.e., reducing the amplitude of) undesirable sound energy, such as music, and/or detecting such undesirable sound energy on a telecommunication connection.

In a first embodiment, a method for suppressing undesirable sound, such as music, during a telecommunication interaction is provided. The telecommunication interaction can be a telephonic communication via the public switched telecommunication network (PSTN), a local area network (LAN), a mobile telephone switching office (MTSO), and combinations thereof. The method includes the steps of:

(a) initiating (e.g., by generating and/or transmitting a suppression and/or detection signal, setting up appropriate data structures to track and/or maintain the suppression feature, etc.) the suppression of a first type of sound energy (e.g., music) communicated on a telecommunication connection;

(b) monitoring the telecommunication connection (e.g., a time slot or space slot corresponding to a subscriber or trunk) for at least one of the first type of sound energy and a second type of sound energy (e.g., voice energy) different from the first type of sound energy; and (c) terminating the suppression when at least one of (i) and (ii) occurs:

(i) the second type of sound energy is communicated on the telecommunication connection or (ii) the first type of sound energy is no longer communicated on the telecommunication connection (e.g., is not detected on the connection) for a predetermined time period, the holding operation is terminated, and/or the connection is terminated). This method provides the telecommunication equipment with the capability of removing unwanted "music-on-hold" from a telephone conversation, even when the source of the "music-on-hold" is not directly under the control of the telecommunication equipment that the user is attached to and using. The method thus provides the user with control over unwanted music sources being provided by equipment located in either private or public networks so that parties on hold can converse without the interference of music. The suppressing step is terminated in step (c) manually or automatically either when music is no longer detected, voice energy is detected, when the party is no longer on hold, (and the first type of sound energy ceases which is the same as (ii) above) and/or the telephone conversation ends.

The suppression can be performed in a variety of ways. For example, the suppression can be performed by disconnecting a user from the telecommunication connection (e.g., by removing a time slot and/or space slot corresponding to the connection from a list of active time slots and/or space slots for the users or subscribers involved in the telephone conversation), filtering out the first type of sound energy from sound energy transmitted by the telecommunication connection, deactivating the source of the first type of sound energy, reducing the amplitude (volume) of the first type of sound energy, etc.

The suppression can be initiated in response to a variety of events. For example, the events can include:

(a) receiving a signal from a subscriber or user to suppress the first type of sound energy;

(b) determining that the telecommunication connection is conducting the first type of sound energy; and/or (c) determining that the telecommunication connection has not conducted the second type of sound energy for a predetermined period. In one configuration when the suppression is initiated, a computational component determines whether a suppression command is to be transmitted to a remote (public) computational component or to a local (private) computational component.

The signal can be generated by the subscriber or user by any suitable technique such as by pressing a button, entering an access code, or automatically by a system manager or administrator or by using a flag or indicator whenever a conference call is initiated, or when the presence of the first type of sound energy or the absence of the second type of sound energy is detected. In one configuration, the telecommunication equipment attaches music detection circuitry to the conference call. The circuitry identifies which leg of the call is playing music and then isolates that leg from the rest of the call. In another configuration where a number of telecommunication connections are participating in the conference call, the determining steps are repeated for each connection.

Once the telecommunication equipment isolates the leg of the call communicating the first type of sound energy from the rest of the call the telecommunication equipment continues to monitor the isolated leg, waiting for the first type of sound energy to cease and/or to be replaced by the second type of sound energy. In one configuration once the second type of sound energy is detected, the leg of the call is reconnected automatically and the party who placed the call on hold is again part of the original conversation. In this manner, the subject invention insures that the disconnected party is reconnected to the conference call to avoid the loss of any of the disconnected party's voice communications.

In yet another embodiment, a method for suppressing undesirable sound energy during a telecommunication interaction is provided that includes the steps of:
- (a) receiving a signal to suppress a first type of sound energy on one or more telecommunication lines;
- (b) determining which of the one or more telecommunication lines are communicating the first type of sound energy, and
- (c) generating one or more commands to suppress the first type of sound energy on a telecommunication line communicating the first type of sound energy. The first type of sound energy is thereafter suppressed by any suitable technique, including the techniques discussed above.

In another embodiment, a system for suppressing undesirable sound during a telecommunication interaction is provided that includes the following components:
- (a) suppressing means for suppressing a first type of sound energy;
- (b) monitoring means for monitoring a telecommunication connection for at least one of the first type of sound energy or a second type of sound energy different from the first type of sound energy; and
- (c) terminating means for terminating the suppressing step when the second type of sound energy is communicated on the telecommunication connection or when the first type of sound energy is no longer communicated on the telecommunication connection.

In yet another embodiment, a system for suppressing undesirable noise during a telecommunication interaction is provided that includes the following components:
- (a) a call processor for managing a plurality of telecommunication connections including a first telecommunication connection communicating sound energy; and
- (b) a sound energy detector, in communication with the call processor via a communications line, for detecting a first type and/or a second type of sound energy and for generating a detection signal. In a first mode when the detection signal is indicative of the presence of the first type of sound energy or the absence of the second type of sound energy on the first telecommunication connection, the call processor causes suppression of the first type of sound energy. In a second mode when the detection signal is indicative of the absence of the first type of sound energy or the presence of the second type of sound energy on the first telecommunication connection, the call processor does not cause suppression of the first type of sound energy.

The system can also have a number of different configurations. For example, in one configuration the call processor manages user time slots and/or space slots and includes a table of active time slots and/or space slots that excludes in the first mode a suppressed time slot and/or space slot corresponding to the first telecommunication connection and includes in the second mode the suppressed time slot and/or space slot. The call processor can include a plurality of tables of active time slots and/or space slots for a plurality of users or connections. Each table corresponds to a different user of or connection to the system. In another configuration, the system can include a plurality of sound energy detectors for simultaneously monitoring a plurality of telecommunication connections or lines.

The above-described embodiments or configurations are neither complete nor exhaustive. As will be appreciated, other embodiments of the invention are possible utilizing, alone or in combination, one or more of the features set forth above and described in detail below.

BRIEF DESCRIPTION OF THE DRAWINGS

FIG. 3 depicts a flow schematic according to one embodiment of the reconnect flowchart of the present invention.

DETAILED DESCRIPTION

Figure 1:
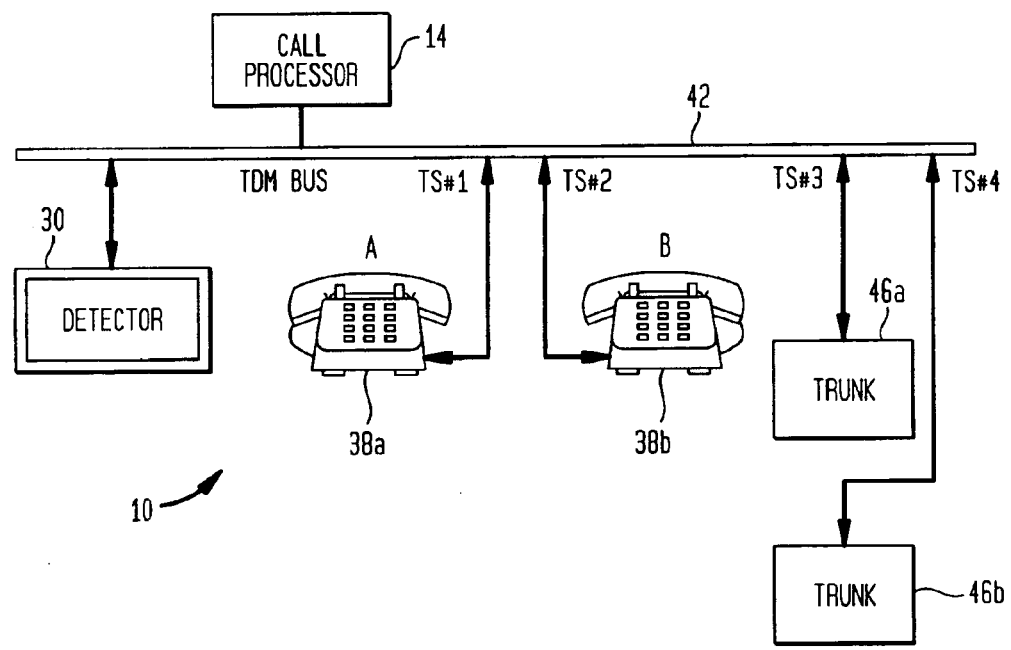
FIG. 1 depicts a system architecture according to one embodiment of the present invention.

FIG. 1 depicts a telecommunication architecture according to one embodiment of the present invention that can be based on any suitable architecture such as "DEFINITY," a product sold by Lucent Technologies, Inc. The architecture is a switching system 10 (e.g., a PBX) that includes a call processor 14 for setting up appropriate data structures to track and maintain a feature during its activation and use, for receiving and processing messages from and for generating and transmitting messages to one or more remote (i.e., nonlocal) computational components (e.g., another switching system), and for receiving and processing local messages from and for generating and transmitting local messages to one or more local computational components, one or more sound energy detectors 30, and one or more subscribers 38a and 38b, all interconnected by a communications line 42, which is typically a TDM bus.

One or more remote users are interconnected to the switching system 10 via a corresponding number of trunks 46a, b. For purposes of explaining the operation of the system, two remote users are assumed to be connected to the switching system 10 via trunks 46a, b. As will be appreciated, more or fewer subscribers and remote users can be connected to the switching system 10 at any one time. For the sake of clarity, a time slot is used as the vehicle to carry sound energy. In general any facility that can carry sound energy can be used (e.g., IP).

In the architecture show a conference call is being held among subscribers 38a, b and the two remote users connected to the switching system via the trunks 46a, b. Each subscriber 38a, b talks to a time slot TS#1 and TS#2, respectively. Each trunk 46a, b talks to a time slot TS#3 and TS#4, respectively. In constructing the conference call, the call processor 14 ordered user A to listen to TS#2, TS#3, and TS#4; user B to listen to time slots TS#1, TS#3, and TS#4; trunk 46a to listen to time slots TS#1, TS#2, and TS#4; and trunk 46b to listen to time slots TS#1, TS#2, and TS#3. These lists of time slots are the table of active time slots for each of user A, user B, trunk 46a, and trunk 46b.

Figure 2:
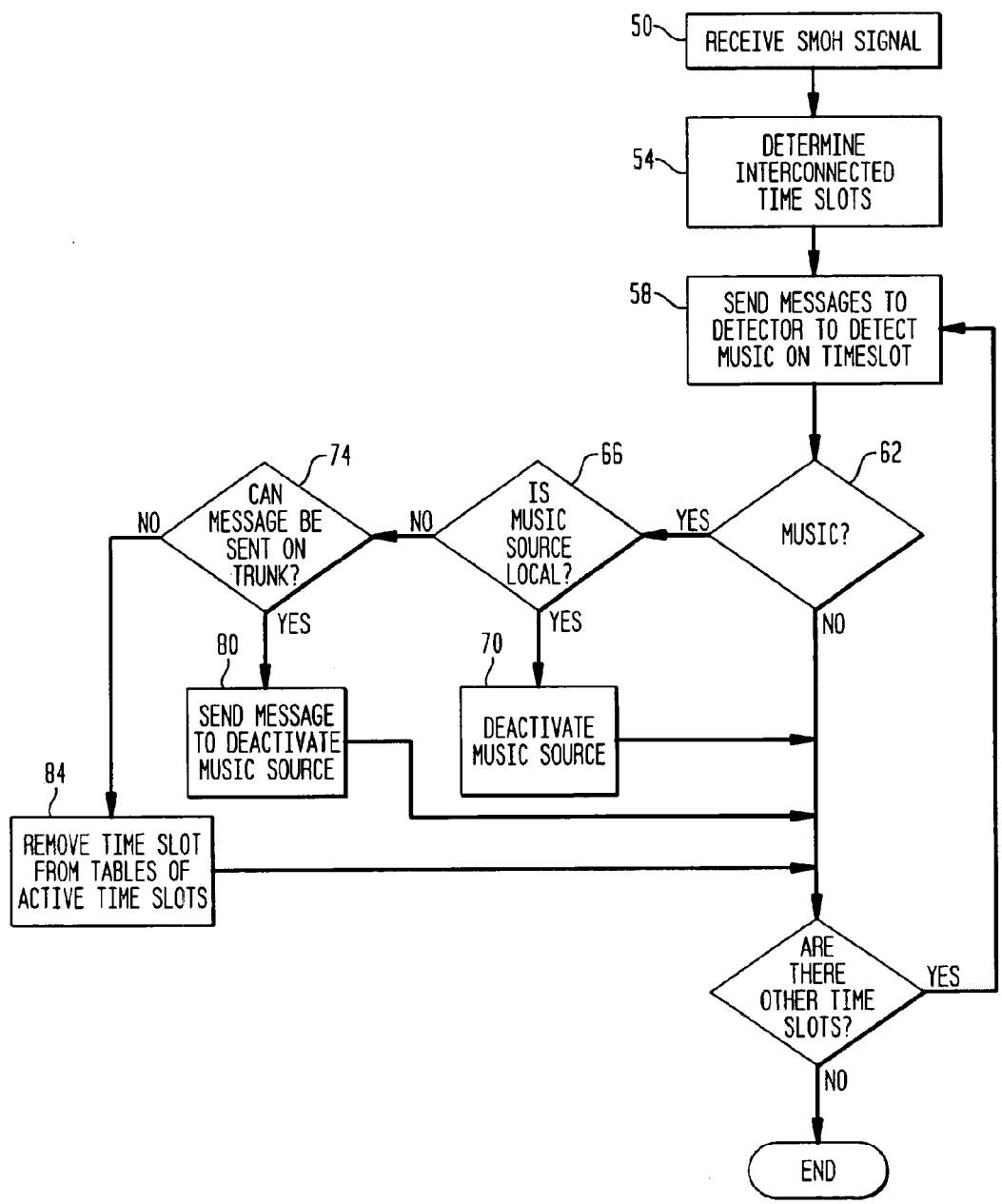
FIG. 2 depicts a flow schematic according to one embodiment of the disconnect flowchart of the present invention.

Referring to FIGS. 2 and 3, the operation of the architecture will be explained for the conference call shown in FIG. 1. One of the subscribers 38a and 38b activates a command to suppress music being received over a time slot in its table of active time slots. The suppress-music-on-hold (SMOH) message can be activated in any suitable manner, such as by pressing a button on the subscriber's telephone, entering an access code into the switching system 10, etc. Alternatively, the command can be activated automatically if a conference call is initiated or participated in by a user or subscriber or if the detector 30 detects, on any active time slot, the presence of music or the absence of voice energy for a predetermined time period. In box 50, the SMOH message is received.

In response to the SMOH message, the call processor 14 sets up appropriate data structures to track and maintain the music suppression feature. For example, the call processor 14 determines 54 the interconnected trunks 46 and subscribers 38 and sends 58 a message to the detector 30 to detect music on the time slot corresponding to a first active time slot in the subscriber's table of active time slots.

The detector 30 determines 62 if music is present on the time slot by any of one or more techniques. For example, the detector 30 can listen for voice energy on the time slot and, if none is detected for a predetermined period of time, conclude that the time slot is transmitting music.

As will be appreciated, voice energy can be detected by any of a number of existing call classifiers. Techniques for detecting voice energy are discussed in detail in Lawrence Rabiner and Biing-Hwang Juang, "*Fundamentals of Speech Recognition*", published by Printice Hall in 1993, which is incorporated herein by this reference. For example, voice energy can be identified by various techniques, such as spectral density analysis, LPC, phoneme detection and the like. Music, or any other non-speech sounds, can be identified as energy that is non-speech with a high degree of certainty. Alternatively, the detector 34 can detect music directly using one or more characteristics of music, such as the frequency characteristics of the music energy, the amplitude characteristics of the music energy, and the like. Alternatively, both speech or voice energy and music energy can be detected independently to reduce the likelihood of a false positive identification and thereby avoid cutting off valid human voice streams (e.g., reduce the risk of making an erroneous determination whether the time slot is carrying music energy).

The call processor 14 receives a status signal from the detector 30 regarding the status of the time slot being monitored.

If music is detected on the time slot being monitored, the call processor 14 determines 66 whether the suppression or removal of the music is to be handled locally by the switching system (e.g., whether the time slot corresponds to a local subscriber or a remote user). If the music can be suppressed locally (which for time slots TS#1 and TS#2 it can be and for time slots TS#3 and TS#4 it cannot be), the call processor 14 directly or indirectly sends a message to the music source in the switching system 10 to deactivate 70 the music.

If the music cannot be suppressed locally, the call processor 14 determines 74 whether a message can be sent on the trunk corresponding to the time slot being monitored to a remote node, such as a remote switching system (not shown). If a message can be sent on the trunk, the call processor 14 sends 80 a message in QSIG or a similar protocol via an ISDN PRI connection to the remote node to suppress the music. The QSIG specification is supported by ISO documents, such as ISO 11572 (Basic Call), ISO 11582 (General Function Protocol), and ISO 11572 (Manufacturer Specification Information). As will be appreciated, the message is defined per the manufacturing specification rules for the protocol, and the remote node can be another "DEFINITY" architecture or another telecommunication architecture that may or may not be able to implement removing or suppressing music produced by a music source local to the architecture.

In response to the message, the remote switching system determines whether any of the interconnected subscriber(s) of that system put the call on hold and, if so, proceeds to deactivate the music or otherwise stop the music from being played. The remote switching system sends a message back to the switching system 10 indicating that the music has been removed from the call. Typically, only the remote switching system removing the music sends a confirmation message back. If a message is received and the remote switching system does not have the call on hold or is not playing music, then no message is sent back. In the event that no message is sent back, the switching system 10 performs additional processing as noted below. If a message is received from a remote switching system, the call processor 14 adjusts its data structures to show that the request has been processed.

If the message cannot be sent on a trunk (or if the remote switching system is not configured to suppress the music), the call processor 14 isolates the time slot corresponding to the trunk by removing 84 the time slot corresponding to the trunk from a table of active time slots assigned to each of the other parties on the call, namely one or both the subscribers 38 and one or both trunks 46.

If there is no music detected on the time slot, if the music source is deactivated in box 70, or if a time slot is removed in box 84 (i.e., the circuit stops listening to that particular time slot), the call processor 14 determines 88 whether there is another time slot in the telephone call (other than the time slot of the party initiating the SMOH message) that has not previously been monitored. When the steps are repeated for each such time slot, the process is terminated.

Referring to FIG. 3, the process for reactivating the isolated time slot(s) is illustrated. After a time slot(s) is isolated (i.e., the circuit stops listening to that particular time slot), the call processor 14 instructs the detector 30 to listen on the isolated time slot(s) for voice energy, an absence of music for a predetermined time, or a combination thereof. This state will continue until the call detector, 30 uplinks a message to the call processor 14 that the detector 30 detects voice energy or that music has not been detected on the time slot for a predetermined period of time or the conference call ends. In the event that the former two events occur, the call processor 14 readjusts its data structures to reconnect the isolated time slot back onto the conference call (e.g., adds the isolated time slot to the table of active time slots assigned to each of the other participants in the conference call). As noted, a call classifier is typically used as the detector in a PBX.

FIG. 3 depicts this process for an architecture in which the monitored time slot is the isolated time slot. The detector monitors (or samples) 100 the time slot either continuously or periodically (at predetermined time intervals). The detector 30 determines 104 if sound energy has been received since the last sample. If so, the detector 30 determines 108 if the sound energy is music. If not, the isolated time slot is added back 112 to the tables of active time slots corresponding to the other time slots in the conference call (i.e., the circuits are instructed to listen to the time slot again). If the detector determines that the sound energy is music or if no sound energy has been received since the last sample, the detector 30 returns to the monitoring step 100.

The dotted lines in FIG. 3 represent alterations to the method if the monitoring or sampling is done discontinuously or in discrete time intervals.

The process for reactivating the music source, whether local or remote, is relatively straightforward. For deactivation of a local music source, the processor reactivates the music source at a predetermined time or event. For example, upon conclusion of the conference call, the processor would forward a suitable control signal to reactivate the music source in the event a party is placed on hold in a later conversation. Likewise, where the deactivated music source is remote, the processor can transmit in the proper protocol a control signal to the remote switching system, either selectively on one trunk or generally on all active trunks to reactivate the remote music source. The signal would be transmitted upon a predetermined event, including the events described above. In this manner, the music source would be enabled for a subsequent telephone conversation involving the same or other parties.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. By way of example, music suppression can be performed by filtering out the music energy from the subject time slot while leaving the time slot as part of the list of active time slots corresponding to each of the other time slots involved in the conference call or otherwise disconnecting a user or subscriber from the switching system. The above-described invention can be used for an architecture using space slots or a combination of time slots and space slots for call management. The above-described invention could eliminate steps 58 and 62 and simply assume that the music is attributable to a source that is external to or remote from the switching system 10. In that event, the switching system 10 could send messages on all active trunks (e.g., in QSIG or IP protocol) to deactivate any music source and/or remove all time slots corresponding to active trunks from the tables of active time slots. The embodiments described herein above are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for suppressing undesirable sound energy during a telecommunication interaction, comprising:
   initiating the suppression of a first type of sound energy communicated on a telecommunication connection;
   monitoring the telecommunication connection for at least one of the first type of sound energy and a second type of sound energy different from the first type of sound energy; and
   terminating the suppression when at least one of (i) and (ii) occurs:
   (i) the second type of sound energy is communicated on the telecommunication connection and
   (ii) the first type of sound energy is not communicated on the telecommunication connection for a predetermined time period, wherein the first type of sound energy is music and the second type of sound energy is voice energy.

2. The method of claim 1, wherein the suppression is performed by removing at least one of a time slot and space slot from a list of active time slots, space slots, or combination thereof.

3. The method of claim 1, wherein the suppression is performed by filtering out the first type of sound energy from sound energy transmitted by the telecommunication connection.

4. The method of claim 1, further comprising:
   receiving a signal to suppress the first type of sound energy;
   first determining that the telecommunication connection is communicating the first type of sound energy; and
   second determining whether a suppression command is to be transmitted to a remote computational component.

5. The method of claim 4, further comprising:
   repeating the first and second determining steps for a second telecommunication connection.

6. The method of claim 4, wherein, when the suppression command is not to be transmitted to a remote computational component, the suppression is performed by:
   removing a time slot or space slot corresponding to the telecommunication connection from a list of active time slots or space slots; and
   wherein, when the suppression command is to be transmitted to a remote computational component, the suppressing step includes:
   deactivating a source of the first type of sound energy.

7. The method of claim 1, wherein event (i) occurs.

8. The method of claim 1, wherein event (ii) occurs.

9. A computer readable medium comprising instructions to perform the steps of claim 1.

10. A system for suppressing undesirable sound energy during a telecommunications interaction, comprising:
    a call processor for managing a plurality of telecommunication connections including at least a first telecommunication connection transmitting sound energy; and
    a sound energy detector, in communication with the plurality of telecommunication connections and call processor, operable to detect at least one of a first type and a second type of sound energy and for generating a detection signal, whereby in a first mode when the detection signal is indicative of the presence of the first type of sound energy and/or the absence of the second type of sound energy on the first telecommunication connection, the call processor causes suppression of the first type of sound energy and, in a second mode when the detection signal is indicative of the absence of the first type of sound energy for a predetermined period of time and/or the presence of the second type of sound energy on the first telecommunication connection, the call processor terminates suppression of the first type of sound energy on the first telecommunication connection, wherein the first type of sound energy is music and the second type of sound energy is voice energy.

11. The system of claim 10, wherein the call processor manages at least one of user time slots and user space slots and includes a table of active time slots, space slots, or combination thereof that excludes at least one of a suppressed time slot and space slot corresponding to the telecommunication line in the first mode and includes the at least one of a suppressed time slot and space slot in the second mode.

12. The system of claim 10, wherein the call processor is operable to determine whether the sound energy source is local; when the sound energy source is local, deactivate the sound energy source; and when the sound energy source is not local, perform at least one of the following operations:
    (i) request a computational component to deactivate the sound energy; and
    (ii) deactivate the communication channel, whereby the first type of sound energy is suppressed.

13. The system of claim 10, further comprising:

a filter for removing the first type of sound energy from sound energy communicated on the telecommunication connection.

14. The system of claim 10, further comprising a plurality of sound energy detectors for simultaneously monitoring a plurality of telecommunication connections.

15. The system of claim 10, wherein the detection signal is indicative of the absence of the first type of sound energy for a predetermined period of time.

16. The system of claim 10, wherein the detection signal is indicative of the presence of the second type of sound energy on the first telecommunication connection.

17. The system of claim 10, wherein the detection signal is indicative of the the absence of the second type of sound energy on the first telecommunication connection.

18. A method for suppressing undesirable sound energy during a telecommunication interaction, comprising:

receiving a signal to suppress a first type of sound energy on one or more telecommunication lines; wherein, the first type of sound energy is music;

identifying a communication channel communicating the first type of sound energy, the first type of sound energy being generated by a sound energy source;

determining whether the sound energy source is local;

when the sound energy source is local, deactivating the sound energy source; and when the sound energy source is not local, performing at least one of the following steps:

(i) requesting a computational component to deactivate the sound energy; and (ii) deactivating the communication channel, whereby the first type of sound energy is suppressed.

19. The method of claim 18, wherein the sound energy source is local when a time slot corresponding to the communication channel corresponds to a subscriber of a switching system receiving a request to suppress the first type of sound energy.

20. The method of claim 18, wherein step (i) is performed.

21. The method of claim 18, wherein step (ii) is performed.

22. The method of claim 18, wherein step (i) is performed and step (ii) is performed when a confirmation message that the sound energy source has been deactivated has not been received from the computational component within a selected period of time.

23. The method of claim 18, wherein step (ii) comprises removing from a table of active slots at least one of a time slot, a space slot, or combination thereof corresponding to the communication channel.

24. The method of claim 18, further comprising:

monitoring the communication channel for at least one of the first type of sound energy and a second type of sound energy different from the first type of sound energy; and terminating the suppression of the first type of sound energy when at least one of (i) and (ii) occurs:

(i) the second type of sound energy is communicated on the communication channel and (ii) the first type of sound energy is not communicated on the communication channel for a predetermined time period.

25. The method of claim 24, wherein the first type of sound energy is music and that the second type of sound energy is voice energy.

26. The method of claim 18, wherein step (ii) is performed by filtering out the first type of sound energy from sound energy being communicated by the communication channel.

27. A computer readable medium comprising instructions to perform the steps of claim 18.

* * * * *